UNITED STATES PATENT OFFICE.

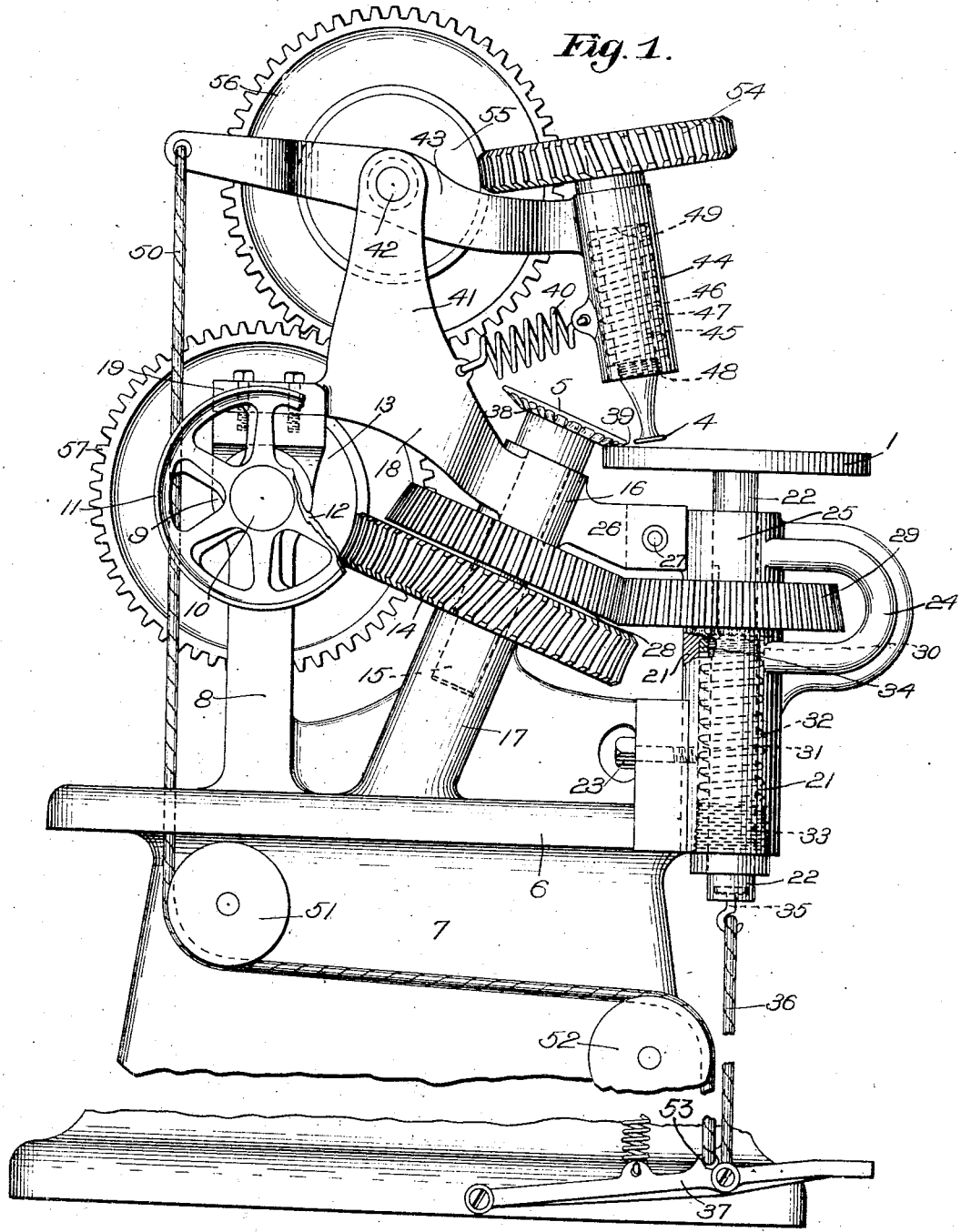

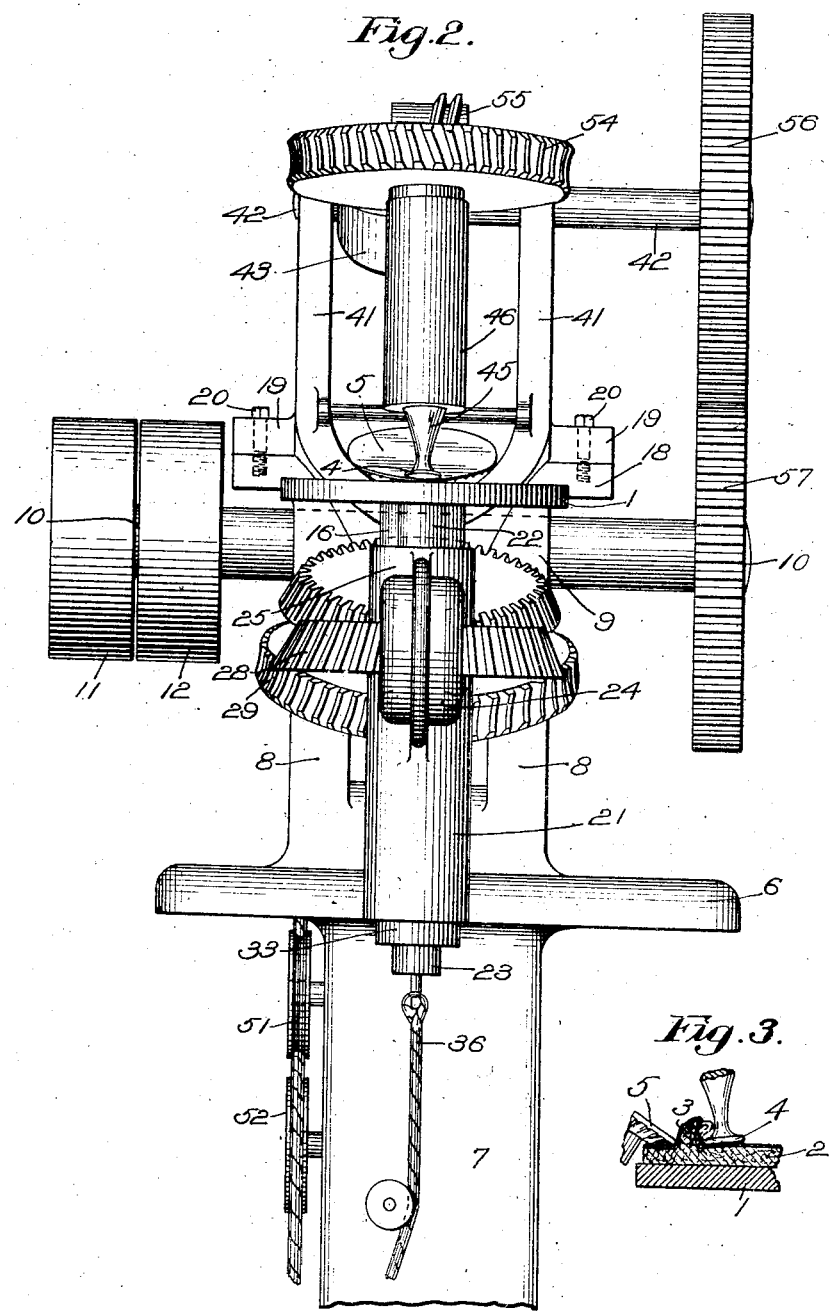

ANDREW THOMA, OF CAMBRIDGE, MASSACHUSETTS, ASSIGNOR TO CLIFTON MANUFACTURING COMPANY, OF BOSTON, MASSACHUSETTS, A CORPORATION OF NEW JERSEY.

INSOLE-FINISHING MACHINE.

1,108,026.  Specification of Letters Patent.  Patented Aug. 18, 1914.

Application filed April 1, 1907. Serial No. 365,801.

*To all whom it may concern:*

Be it known that I, ANDREW THOMA, a citizen of the United States, and a resident of Cambridge, in the county of Middlesex and State of Massachusetts, have invented an Improvement in Insole-Finishing Machines, of which the following description, in connection with the accompanying drawings, is a specification, like letters on the drawings representing like parts.

My invention relates to machines known to the trade as insole finishing machines, wherein the reinforcing material, which has been applied to the insole and beaded over or cemented to one or both sides of the rib or lip on said insole, is forced or firmly pressed against it.

My invention aims, generally, to improve machines of this type by providing simple and efficient means for properly defining the angles or channels at the base of the lip of a reinforced insole by pressing the reinforcing material against said base, to cause said material firmly to adhere thereto and also to the outer margin or feather of the insole. The above, however, with other features and objects of my invention, will be best understood and appreciated from the following description and accompanying drawings of a machine embodying one form of my invention and selected for purposes of illustration, its scope being more particularly pointed out in the appended claims.

In the drawings: Figure 1 is an elevation of the left side of a machine, with parts broken out, embodying one form of my invention and selected for purposes of illustration; Fig. 2, a front elevation thereof;
and Fig. 3, a vertical, sectional detail to illustrate the action of the rollers upon the reinforcing materials at the base of the lip.

Referring to the drawings and to the particular embodiment of my invention herein selected for purposes of illustration (see Fig. 1), the machine is provided with suitable means, here shown as a rotary work table 1 (Fig. 1), for supporting and feeding a reinforced insole 2 (Fig. 3) while the latter is preferably operated upon by suitable rotary work members or tools. These tools receive the reinforced lip 3 of the insole between them and continuously press the fabric covering said lip against both sides of the base thereof and also against the body of the insole adjacent said lip. The rotary tools, preferably provided for this purpose, comprise wheels or rollers 4, 5 (Fig. 3), having narrow and curvilinear rims shaped to fit into the channels or angles at the base of the lip and to force the reinforcing fabric into said channels, the lip with its cover of reinforcing material extending above said wheels, so that it may yield or curve over slightly under the action thereof (see dotted lines, Fig. 3), to permit forcing or tucking the fabric firmly against the base of the lip and to cause it to adhere thereto.

The rotary work table 1 and the rollers 4 and 5 are forced into operative relation with one another by the action of suitable springs, hereinafter described, to effect continuous pressure upon the reinforcing fabric at the base of the lip and the portions of the insole adjacent thereto, so that when the insole has been run through the machine, the channels at the base of the lip are properly defined or formed and the insole prepared to have the upper efficiently stitched thereto. For mounting or supporting and operating the table 1 and said rollers 4 and 5 and their connections, I provide a suitable supporting frame comprising, in the present instance, a base 6 (Fig. 1), adapted to be secured to a bench or, preferably and as here shown, to the head of a column 7. Rising from this base are uprights 8, provided at their heads with suitable bearings 9, for a horizontal drive shaft 10, having loose and fast pulleys 11 and 12, respectively, at its left end (Fig. 2), adapted to be rotated from any convenient source of power. Intermediate its bearings 9, said drive shaft 10 is provided with a large worm 13 (Fig. 1), in mesh with an inclined worm-wheel 14, fast on an inclined shaft 15. This shaft is rotatably mounted in upper and lower inclined bearings 16 and 17 (Fig. 1), respectively, the latter being preferably integral with the base 6. As here shown (Fig. 2), the upper bearing 16 is centrally formed upon a yoked bracket 18, secured in any suitable manner to the heads of said uprights 8, as by the rearwardly extending horizontal lugs 19 and securing bolts 20. At its front, the base 6 is also provided with a vertical, tubular bearing 21 for the supporting shaft 22 of the rotary work table 1, said bearing being bolted to said base at 23.

At its head, this bearing has a yoke 24, the upper arm of which is formed to provide an upper shaft bearing 25, which, in the present instance, is bolted at 27 to a forwardly projecting arm 26 of the bracket 18. By this construction the separable parts of the frame are secured together to form a rigid support for the operative parts of the machine.

For rotating the work table 1, the inclined shaft 15 is provided, between the bearing 16 and the worm-wheel 14, with a bevel gear wheel 28, in mesh with a bevel gear 29, splined on the vertical shaft 22 which carries the work table 1. This shaft is slidably and revolubly mounted in said upper and lower bearings 25 and 21 respectively, and, through the splined connection with said bevel gear 29, is also slidable in said gear, to permit elevation and depression of said table. The gear wheel 29 is rotatably mounted between said bearings 25, 21, and the arms of the yoke 24, the horizontal upper supporting face of the lower bearing 21 being preferably provided with a suitable anti-friction bearing, as the ball bearing 30, to facilitate rotation of said gear wheel thereon.

The work table 1, here shown preferably as horizontal and circular and which constitutes the support for the insole, is secured to the head of its vertically slidable supporting shaft 22, rotation of which rotates said work table. This table thus coöperates with the working members or rotary wheels 4 and 5 to present or feed said insole thereto and also to press and conform the fabric to the angles or channels at the base of the lip.

My machine is especially adapted to operate upon insoles of the Gem type, described in the patent to Cole, No. 575,460, or such as are provided with an outer channel formed by turning up a lip from the edge of the insole; those having an inner channel formed by turning up a flap; or insoles that have both an inner and outer channel and where the flap and lip are secured or cemented together and over which the reinforcing fabric is beaded. It will be understood by those skilled in the art that by a "lip", hereinbefore referred to, I mean the tongue projecting from the body of the insole and by "channels", the angles formed at the base or root thereof, between said lip and the body of the insole, and irrespective of whether channels are actually cut in the insole or not.

To facilitate placing the insole in operative position relative to the operating rollers 4 and 5, the shaft 22 of the work support or table 1 is mounted to slide vertically in said bearings 21, 25, and for normally maintaining said shaft, and thereby said table, in its upper or elevated position, the tubular bearing 21 is provided with a cylindrical recess 31, of sufficient diameter to receive said shaft and a coil spring 32 surrounding the same, which acts to elevate said shaft and lift the table under the pressure of said spring, thus yieldingly supporting it in operative relation with the rotary finishing wheels 4 and 5. This spring, 32, in the present instance, is interposed between an adjustable nut or plug 33 (Fig. 1), threaded into the bottom opening in the tubular bearing 21, and a collar 34 adjustably secured on said shaft 22. The nut 33 is apertured to permit the shaft 22 to slide therein and by adjustably securing said nut in the bearing 21, suitable and convenient means are provided for varying the tension of the elevating spring 31 and, hence, the lifting force applied to said table 1.

To provide means for conveniently depressing or lowering the work table 1, so that the feather or marginal portion of the insole may be slid under the wheel 5, the lower end of the shaft 22 is connected in any suitable manner, here shown as by the swivel hook 35, and connection 36, with a suitable controlling lever, preferably a treadle 37, pivoted at the base of the column. The tread of this treadle extends forward at the side of the machine, within convenient reach of the operator's foot, so that it may be readily depressed to pull down the work table when an insole is to be inserted or removed.

The rotary work member or tool 5 is secured to the head of the inclined shaft 15 and is provided with a bevel face, which is corrugated as shown at 38. This wheel rotates in fixed position and coöperates with the table 1 to clamp the outer marginal portion or feather of the insole between its corrugated face and the horizontal face of the spring supported work table. The bevel gears of the rotary shafts 15 and 22 being in mesh, rotation of the former, through the action of the worm 13 and worm wheel 14, causes these gears, and hence the work table 1 and said roller 5, to rotate in opposite directions, thereby causing the adjacent insole engaging portions thereof to move in the same direction to impart feeding movement to the insole gripped between them. When this wheel 5 is rotated, the corrugations 38 of its lower bevel face smooth out the fabric over the margin or feather of the insole and press it into firm contact therewith to cause it to adhere thereto. The edge or rim of this wheel runs in the outer angle between the lip and the insole, or the outer channel if such be provided. The rotating rim of this wheel gathers up, stretches, and indents or tucks the fabric into said channel, to form or properly define a channel in the fabric so that when the upper is subsequently stitched to the insole, the needle, in passing through the base of the lip, will immediately pierce the fabric. For this reason the fabric should be firmly cemented at the base of the lip, so as to unite the same together and to prevent tearing of either the lip or fabric separately, as is common when the fabric is not properly applied and secured to the base of the lip. As here shown, the wheel 5, or its rim, is arranged at an angle relatively to the supporting face of the work table and the insole supported thereon, which permits said rim to run in the outer channel and to press directly upon the base of the reinforced lip.

In the present instance, the rotary wheel 4 is also arranged at an angle relative to the work table 1 and also inclined like the wheel 5 (see Fig. 1), so that the inner edge 39 of the rim of said wheel may enter the inner channel at the inner side of the lip and force or press the fabric into it. This wheel is not only mounted to rotate so that its engaging rim 39 travels in the same direction as those of the wheel 5 and table 1, but it is also acted upon by a stiff coil spring 40, to swing it inward toward the wheel 5, so that the fabric at both sides of the lip (Fig. 3) may be continuously tucked or pressed into place in the insole channels under the action of a constant force rather than intermittently, as when reciprocating tools are employed. To provide suitable means for mounting and operating this wheel 4 to secure these results, the arms 41 (Fig. 1) of the yoked bracket 18 are extended vertically and, at their upper ends, are provided with suitable bearings for a rotary shaft 42. This shaft forms the fulcrum for a horizontal angular lever 43, the front arm of which is provided with an inclined cylindrical socket-bearing lug 44, within which is rotatively and slidably mounted the shaft 45 of said wheel 4. This shaft is normally maintained depressed, to cause the wheel to press the work, by a coil spring 46 surrounding said shaft, the cylindrical recess 47 in the lower end of the bearing lug 44 being enlarged to receive the shaft and its spring. This spring is interposed between an adjustable collar 48, threaded on the shaft of said tool and slidable in said recess 47, and a shoulder 49 of the latter, so that the shaft and its wheel are normally forced down toward the table, to cause its rim to enter and run in the inner channel at the base of the lip, and under a pressure that may be regulated by varying the tension of said spring, through adjusting the collar 48. To cooperate with this spring 46 in producing the desired vertical pressure upon the insole, the outer or front arm of the carrier lever 43 is normally depressed and the roller 4 swung inward by the action of the stiff coil spring 40, to which reference has been made, and which connects the shaft bearing 44 with a vertical yoke arm 41 of the bracket 18. This spring, however, is adapted to yield, to permit swinging the wheel 4 forward when the table is depressed for convenience in inserting and positioning the insole or work. That suitable means may be provided to effect this movement, and preferably simultaneously with the depression of the work support, the rear arm of the lever 43 is provided with a flexible connection for connecting it with the treadle 37, for example the cord 50, which runs over guide pulleys 51, 52, and is connected as at 53 with said treadle 37. By this arrangement, the depression of the treadle not only lowers the work table, but swings the wheel 4 away from its coöperating wheel 5, so that the insole 2 and its lip 3 may be placed in proper position relative to the wheel 5. When an insole has been placed in such position, release of the treadle causes the table to rise through the action of its spring, to clamp the insole between the table and rim of the wheel 5, the rim of the wheel 4 simultaneously engaging the front of the lip to press it and clamp it against said wheel 5.

For rotating the working tool or wheel 4, its shaft 45 is provided with a worm-wheel 54, in mesh with a worm 55 fast on the upper horizontal shaft 42, said shaft being driven by the rotation of a large gear 56, fast on its right end, in mesh with a similar large gear 57 on the corresponding end of the drive shaft 10, the rotation of which rotates the upper gear wheel 56 and thereby said worm 55, worm-wheel 54 and working wheel 4.

In operation, the operative first depresses the treadle to separate the work support and the rotary work rollers or wheels 4 and 5, and places a reinforced insole, with its feather or marginal portion below the corrugated face of the wheel 5, bringing the lip 3 of the insole against the rim of said wheel. The treadle is then released, the springs 32 and 40 acting to return the work support and said wheel 4 to their normal insole and lip clamping or pressing positions with the lip confined and pressed between the wheels 4 and 5. The machine is then started, in the usual manner, to effect rotation of the work support 1 and wheels 4 and 5, as described. By the simultaneous action of these members 4 and 5, the insole gripped between them is continuously fed from right to left (Fig. 2) and the fabric pressed firmly in place to properly define and form the channels at the opposite sides or base of the lip, where the stitching strain is apt to come when the uppers are secured thereto.

The action of the machine is rapid and it does its work in a thoroughly efficient manner, so that the fabric is set and its adhesion to the leather secured at the points most desired, that is, at the base of the insole lip.

The opposed faces of the fabric or lip engaging wheels are arranged at an angle to one another, so that their rims may enter the angles or channels at the base of the lip, leaving the upper portions of the latter free to be deflected or curled over wherever the fabric is drawn upon to furnish material in forming said channels and where it had been improperly applied, it being of more importance to properly define the channels than that said lip should stand up straight, since the channels give shape or style to the shoe.

My invention, obviously, is not limited to the particular embodiment herein selected for purposes of illustration only, nor to the specific details of construction and arrangement, but is capable of modification within wide limits without departing from the spirit and scope thereof.

Claims.

1. In a machine for finishing insoles, the combination of an insole support, devices having curvilinear, bead like pressure surfaces acting angularly relative to the insole to engage portions of the reinforcing fabric overlying the channels at the base of the lip and the feather or margin of said insole, means for causing said devices continuously to press said reinforcing fabric into said channels, and means for separating said devices to permit the lip of the insole to be positioned between them.

2. In a machine for finishing insoles, the combination of a rotary table for supporting an insole, a pair of wheels adapted to engage the reinforcing fabric at the opposite sides of the base of the lip of said insole, and means connected with the work table and also with said wheels for positively rotating the same to cause them to feed the insole clamped between them and to press said fabric continuously against said base.

3. In a machine for finishing insoles, the combination of means to support an insole; a plurality of devices to press the insole upon its supporting means, the same having narrow bead-engaging pressure surfaces constructed and arranged to engage the reinforcing material at the base of the bead and the feather of the insole while leaving the bead otherwise free; and means for causing said surfaces to press continuously against the reinforcing material.

4. In a machine for finishing insoles, the combination of means for supporting an insole and means coöperating therewith and comprising a plurality of positively actuated devices arranged at an angle relative thereto and to one another having pressing surfaces spaced apart to receive the reinforced lip of the insole between them to apply continuous pressure to the reinforcing fabric at the base of said lip.

5. In a machine for finishing insoles, the combination of a rotary support, a pair of relatively yielding pressure devices arranged at an angle therewith having pressure surfaces disposed to engage narrow, longitudinal sections of the reinforcing material overlying the channels at the base of the lip of said insole for transmitting continuous pressure thereto, and means relatively to maintain said support and said pressure devices continuously pressed toward one another in pressing engagement with the fabric in said channels.

6. In a machine for finishing insoles, the combination of a rotary work support adapted to receive and support an insole, a pair of wheels angularly arranged relatively thereto and to one another having narrow rims shaped and adapted to engage the channels at the base of the reinforced lip of an insole received between them, means relatively to maintain said wheels and said work support in clamping relation one with another and to cause said wheels to impart continuous pressure to the fabric at the base of said lip and overlying said channel portions for causing the same to adhere thereto, and means for effecting simultaneous rotation of said work support and said wheels to cause feeding movement of the insole.

7. In a machine for finishing insoles, the combination of a rotary work support, an inclined bevel faced wheel provided with corrugations and adapted to be rotated to successively present said corrugations in parallel relation to the supporting face of said work support, said wheel having a rim shaped to engage the reinforcing material in the outer channel at the base of the lip of said insole, a yieldingly mounted wheel having a narrow rim to engage the fabric overlying the channel at the base and opposite side of said lip, and means for normally and relatively moving said wheels toward one another to cause said wheels to apply continuous pressure to the fabric engaged thereby for continuously pressing the same into said channels.

8. In a machine for finishing insoles, the combination of a rotary work support, an inclined bevel faced wheel provided with corrugations and adapted to be rotated to successively present said corrugations in parallel relation to the supporting face of said work support, said wheel having a narrow rim shaped and adapted to engage the reinforcing material overlying the outer channel at the base of the lip of said insole, a yieldingly mounted wheel having a narrow rim to engage the fabric overlying the channel at the base and opposite side of said lip, means for normally and relatively moving said wheels toward one another to cause said wheels to apply continuous pressure to the fabric engaged thereby for pressing the same into said channels, and means for rotating said wheels and said work support for feeding the said insole.

9. In a machine for finishing insoles, the combination of a supporting frame, a work support yieldingly mounted thereon, a rotary wheel pivotally mounted on said frame and adapted to be moved toward and from said work support, and means connected therewith and also with said work support for respectively swinging said wheel toward and from operative position relative to said work support and for depressing the latter.

10. In an insole finishing machine, the combination of a work support, an inclined wheel having a bevel face adapted to engage the feather or marginal portion of an insole supported on said work support, and a second wheel operatively mounted to present its rim in juxtaposition to said work support and the rim of the bevel faced wheel and inclined at an angle relative to said support and said wheel, said wheels being adapted to receive the reinforced lip of said insole and to coöperate with said work support in continuously applying pressure to the reinforcing material overlying said lip and the adjacent body portions of said insole.

11. In an insole finishing machine, the combination of a work support, a plurality of wheels mounted to rotate in planes inclined to one another and to the supporting face of said work support, and means for imparting continuous pressure to said work support and one of said wheels and pressing them into operative relation with the other wheel.

12. In an insole finishing machine, the combination of a supporting frame and a plurality of work supporting and engaging members operatively mounted thereon, comprising a rotary work supporting wheel 1, an inclined wheel 5 adapted to engage the feather or marginal portion of an insole supported on said work supporting wheel 1, a second wheel 4, having its axis inclined to that of said wheel 5, and means for rotating one of said wheels and said work support for feeding said insole.

13. In an insole finishing machine, the combination of a rotary work table 1, a pair of wheels 4 and 5 mounted at an inclination relatively to one another and to said work table, and means for relatively and continuously pressing said work table and said wheels toward one another.

14. In an insole finishing machine, the combination of a rotary work table 1, an inclined wheel 5 adapted to engage the feather or marginal portion of an insole supported on said table, a second inclined wheel 4, mounted to rotate in a plane inclined to that of said wheel 5 and presenting an inclined rim adapted to engage the fabric on the inner side of the lip of said insole, means for moving said work table and said wheels relatively for causing them to continuously apply pressure to the reinforcing material upon and adjacent said lip, and means for simultaneously rotating said wheels and said work table for feeding said insole to present its reinforced lip in operative relation therewith.

15. In a machine for finishing insoles, the combination of means to support an insole; and a plurality of working devices having narrow pressure surfaces constructed and arranged to force the reinforcing material into the opposite angles between the sole and bead, while leaving the bead otherwise free.

16. In a machine for finishing insoles, the combination with a work support of a plurality of tucking devices having narrow, acting surfaces constructed and arranged to force the reinforcing material into the angle at the base of the bead and feather of the insole while leaving the remainder of the bead substantially free.

17. In a canvas laying and creasing machine, a rotatable table, an arm pivotally mounted with relation to the table, a creasing tool mounted on said arm and rotatably supported at an angle less than a right angle with relation to the table, means for rotating the creasing tool, a work engaging member coacting with the table, and means for rotating the work engaging member.

18. In a machine for finishing insoles, the combination of means to support an insole and a plurality of working devices having narrow pressure surfaces constructed and arranged to force the reinforcing material into the angle between the sole and lip, while leaving the lip otherwise free.

In testimony whereof, I have signed my name to this specification, in the presence of two subscribing witnesses.

ANDREW THOMA.

Witnesses:
SIDNEY F. SMITH,
EVERETT S. EMERY.